E. V. HEAFORD.
EYE PROTECTOR.
APPLICATION FILED DEC. 12, 1916. RENEWED APR. 21, 1919.

1,310,077.

Patented July 15, 1919.

INVENTOR.
Edwin V. Heaford
BY J. M. G. Powell
ATTORNEY.

UNITED STATES PATENT OFFICE.

EDWIN V. HEAFORD, OF DENVER, COLORADO.

EYE-PROTECTOR.

1,310,077.  Specification of Letters Patent.  Patented July 15, 1919.

Application filed December 12, 1916, Serial No. 136,435. Renewed April 21, 1919. Serial No. 291,632.

*To all whom it may concern:*

Be it known that I, EDWIN V. HEAFORD, a citizen of the United States, and a resident of the city and county of Denver and State of Colorado, have invented certain new and useful Improvements in Eye-Protectors, of which the following is a full, clear, and exact description, such as will enable others skilled in the art to which the invention appertains to make and use the same.

The invention relates to eye protectors adapted to shield the eyes from the glare of lights.

The invention has for its object the provision of an eye protector adapted to be applied to and cover the lens of eye glasses of ordinary form.

Another object of the invention is to provide an eye protector adapted to be conveniently attached to the frame of eye glasses of ordinary form and removed from the latter whenever desired.

With these and other objects in view, the invention will now be described with reference to the accompanying drawing, which forms a part hereof.

Figure 1:
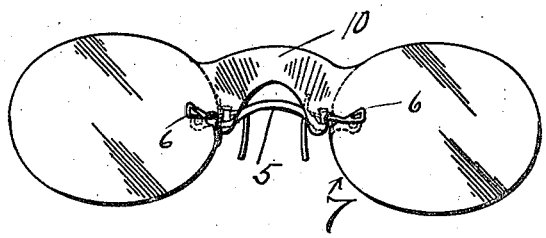
Figure 2:
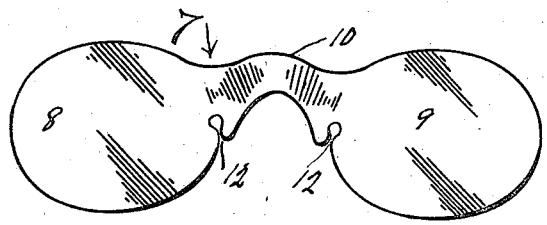
Figure 3:
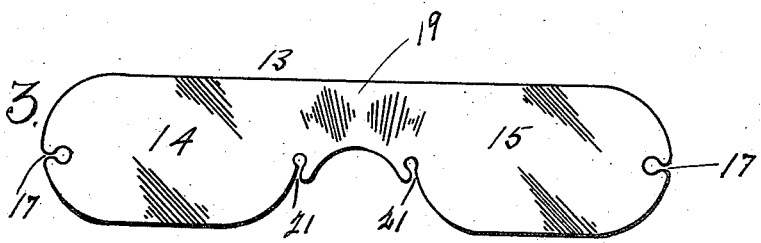
Figure 4:
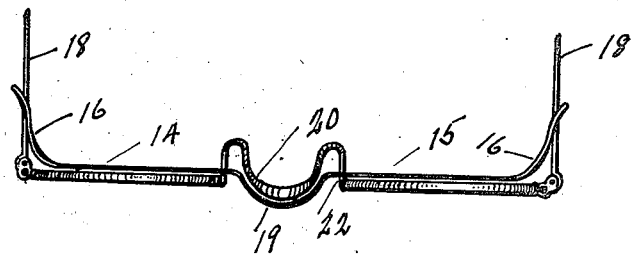

In this drawing, Figure 1 is a view of the eye protector applied to the commonly known nose glasses; Fig. 2 is a view of the protector removed from the glasses; Fig. 3 is a view of a different form of eye protector; and Fig. 4 is a view illustrating the form of eye protector shown in Fig. 3 in its application to a spectacle frame.

Corresponding and like parts are referred to in the following description and indicated in all the views of the accompanying drawing by the same reference characters.

Referring first to the form of the invention shown in Figs. 1 and 2, let the numeral 5 represent the frame of the usual nose glasses, having the projecting finger pieces 6. The numeral 7 represents the protector, which is formed of celluloid, or other suitable material of any suitable color to effect the desired softening of the light. This protector is shaped to conform to the shape of the glasses, and is adapted to be applied to the frame 5 of the glasses and cover the lenses thereof. 8 and 9 represent the two lenses of the protector, which are connected by means of the bridge strip 10, formed of the same material and integral with the lenses 8 and 9, the bridge piece 10 being shaped to conform to the nose piece of the glasses. Notches 12 are formed in the protector 7 adjacent the bridge strip 10, and in which notches 12, the finger pieces 6 are received, thereby holding the lenses 8 and 9 of the protector 7 over the lenses of the glasses. The arc of the bridge strip 10 is contracted while the protector is being applied to the glasses, and after the finger pieces 6 have been engaged in the notches 12, the tension resulting from the contraction of the bridge strip 10 will act upon the lenses 8 and 9 of the protector 7 to hold said lenses closely against the lenses of the glasses and also to hold the protector 7 rigidly against said lenses of the glasses.

In Figs. 2 and 3, the protector herein designated 13, is formed to shield the eyes from the sides and from the top. This form of the invention is adaptable for application to the frame of spectacles, as distinguished from nose glasses. The lenses of the protector 13 are designated 14 and 15, the said lenses being of elliptical shape, whereby they may be bent rearwardly, as shown in Fig. 4 and as represented at 16, notches 17 being formed in the outer extremities of the lenses 14 and 15 and adapted to receive the bars 18. A bridge strip 19 connects the two lenses 14 and 15, the same being integral with the lenses 14 and 15 and of bow-shape to conform to the nose piece 20 of the spectacle frame. This protector 13 is provided with notches 21 therein adjacent the bridge strip 19, which said notches 21 receive the spectacle frame, as shown at 22. The bridge strip 19 in this form extends upwardly on a line with the top of the lenses 14 and 15, and serves as a shield from above and adjacent the nose of the user.

While I have described and illustrated herein a specific form of my invention, it is understood that I am not limited thereto and that the same may be modified and varied without departing from the spirit of the invention of the scope of the appended claims.

Having thus described my invention, what I claim and desire to secure by Letters Patent is:—

1. An eye protector adapted to be applied to the frame of an eye glass, comprising a strip of material having parts adapted to cover the lenses of the eye glass, said parts having a connecting bridge strip conforming to the nose piece of the eye glass frame, and said strip of material having notches therein adjacent said bridge strip adapted to receive the frame of the eye glass.

2. Means for application to eye glasses for protecting the eyes, comprising a strip of material having parts adapted to cover the eye glasses, said parts being connected by a strip of material integrally formed with said parts, said strip of material being of bow-shape and adapted to be placed under tension, and said strip of material having notches therein adapted to receive parts of the frame of the eye glasses and permit said strip of material to expend its tension against said parts of the frame of the eye glasses.

Dec. 9th, 1916.

In testimony whereof I affix my signature in presence of two witnesses.

EDWIN V. HEAFORD.

Witnesses:
A. E. ENGLISH,
JOHN C. MICHAEL.